US010911355B2

(12) United States Patent
Dontula Venkata et al.

(10) Patent No.: US 10,911,355 B2
(45) Date of Patent: Feb. 2, 2021

(54) MULTI-SITE TELEMETRY TRACKING FOR FABRIC TRAFFIC USING IN-BAND TELEMETRY

(71) Applicant: Cisco Technology, Inc., San Jose, CA (US)

(72) Inventors: Ratnananda Ganesh Dontula Venkata, Dublin, CA (US); Ravikanth Nasika, Fremont, CA (US); Saikat Bhattacharya, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 16/212,569

(22) Filed: Dec. 6, 2018

(65) Prior Publication Data

US 2020/0186465 A1 Jun. 11, 2020

(51) Int. Cl.
*H04L 12/741* (2013.01)
*H04L 12/46* (2006.01)
*H04L 12/947* (2013.01)
*H04L 29/06* (2006.01)

(52) U.S. Cl.
CPC .......... *H04L 45/74* (2013.01); *H04L 12/4633* (2013.01); *H04L 12/4641* (2013.01); *H04L 49/25* (2013.01); *H04L 69/22* (2013.01)

(58) Field of Classification Search
CPC ......... H04L 45/74; H04L 49/25; H04L 69/22; H04L 12/4641; H04L 12/4633
See application file for complete search history.

(56) References Cited

U.S. PATENT DOCUMENTS

| 2015/0124826 | A1* | 5/2015 | Edsall | ............... H04L 45/74 370/392 |
| 2016/0142269 | A1 | 5/2016 | Konduru et al. | |
| 2016/0226622 | A1* | 8/2016 | Kasher | ............ H04L 27/2613 |
| 2017/0324660 | A1* | 11/2017 | Sinha | ............... H04L 45/586 |

(Continued)

FOREIGN PATENT DOCUMENTS

CN 108199924 A 6/2018

OTHER PUBLICATIONS barefootnetworks.com, "Barefoot Deep Insight," 2018, 7 pages.

(Continued)

*Primary Examiner* — Jeffrey M Rutkowski
*Assistant Examiner* — Chae S Lee
(74) *Attorney, Agent, or Firm* — Patterson + Sheridan, LLP

(57) ABSTRACT

Techniques for utilizing in-band telemetry (INT) in network fabrics are provided. A packet is received at a leaf node in a first logical group of nodes. Upon determining that the first packet was received from a node outside of the first logical group of nodes, the packet is encapsulated with a first header indicating an internal virtual extensible local area network (iVXLAN) identifier associated with the packet, and a second header indicating a policy group is added to the packet. Further, upon determining that a destination of the packet is associated with a second logical group of nodes, a third header is added to the first packet, where the third header stores in-band network telemetry (INT) for the packet, and telemetry data is added to the third header. The packet is transmitted to a spine node in the first logical group of devices.

20 Claims, 11 Drawing Sheets

(56) References Cited

U.S. PATENT DOCUMENTS

2018/0159770 A1* 6/2018 Nakagawa .............. H04L 41/12
2020/0036553 A1* 1/2020 Andersson .......... H04L 12/4633

OTHER PUBLICATIONS

Frank Brockners, "Next-gen Network Telemetry is Within Your Packets: In-band OAM," cisco.com, Jun. 28, 2017, 51 pages.
Changhoon Kim, Parag Bhide, Ed Doe, "In?band Network Telemetry (INT)," Barefoot Networks, Jun. 2016.
https://github.com/opencomputeproject/SAI/blob/master/doc/DTEL/SAI-Proposal-Data-Plane-Telemetry.md "Data Plane Telemetry (DTEL)" Barefoot Networks, 2017.

* cited by examiner

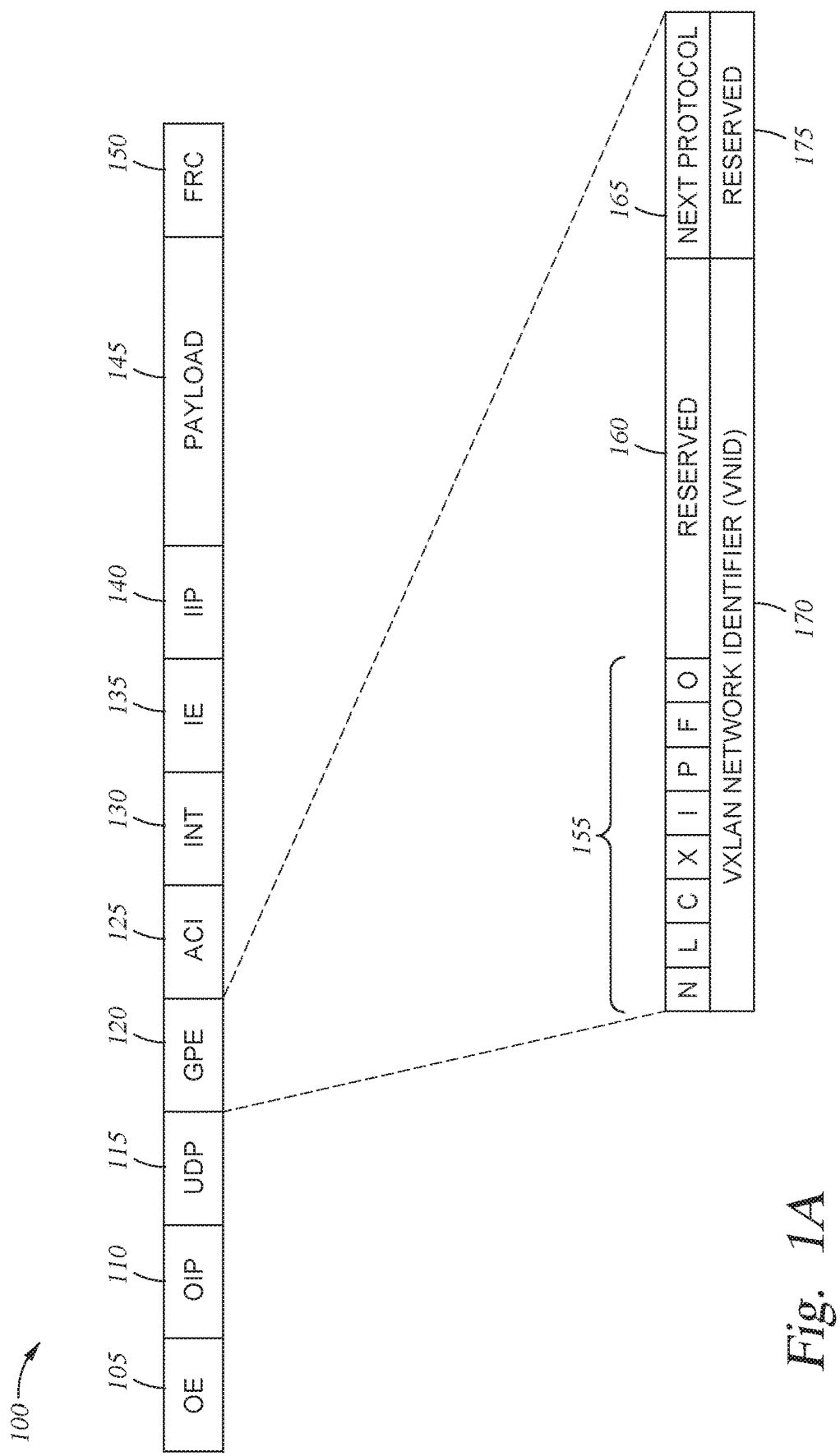

MULTI-SITE TELEMETRY TRACKING FOR FABRIC TRAFFIC USING IN-BAND TELEMETRY

TECHNICAL FIELD

Embodiments presented in this disclosure generally relate to packet telemetry. More specifically, embodiments disclosed herein relate to use of in-band telemetry to track packets across one or more fabrics or sites.

BACKGROUND

Networks can be implemented using a wide a variety of infrastructures and architectures, depending on the desired functionality. One network topology that has been increasingly utilized in recent years involves fabric technology, where network nodes are arranged into logical groups, or fabrics, that can be linked to enable further functionality. For example, Cisco® Application Centric Infrastructure (Cisco ACI™) utilizes a leaf-spine fabric that enables efficient communications between workloads, virtual machines, logical partitions, and the like. Further, fabrics can be interconnected in order to connect data centers, deployments, and locations. In-band network telemetry (INT) can be used with some network topologies, and provides a means of tracking a packet's path through a network. Generally, INT involves storing telemetry in a header of the packet, as it traverses the network. Each switch or network node that receives the packet appends its relevant telemetry in the header, before forwarding the packet to the next node.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1A illustrates a packet format to enable in-band telemetry in ACI fabric, according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1B:
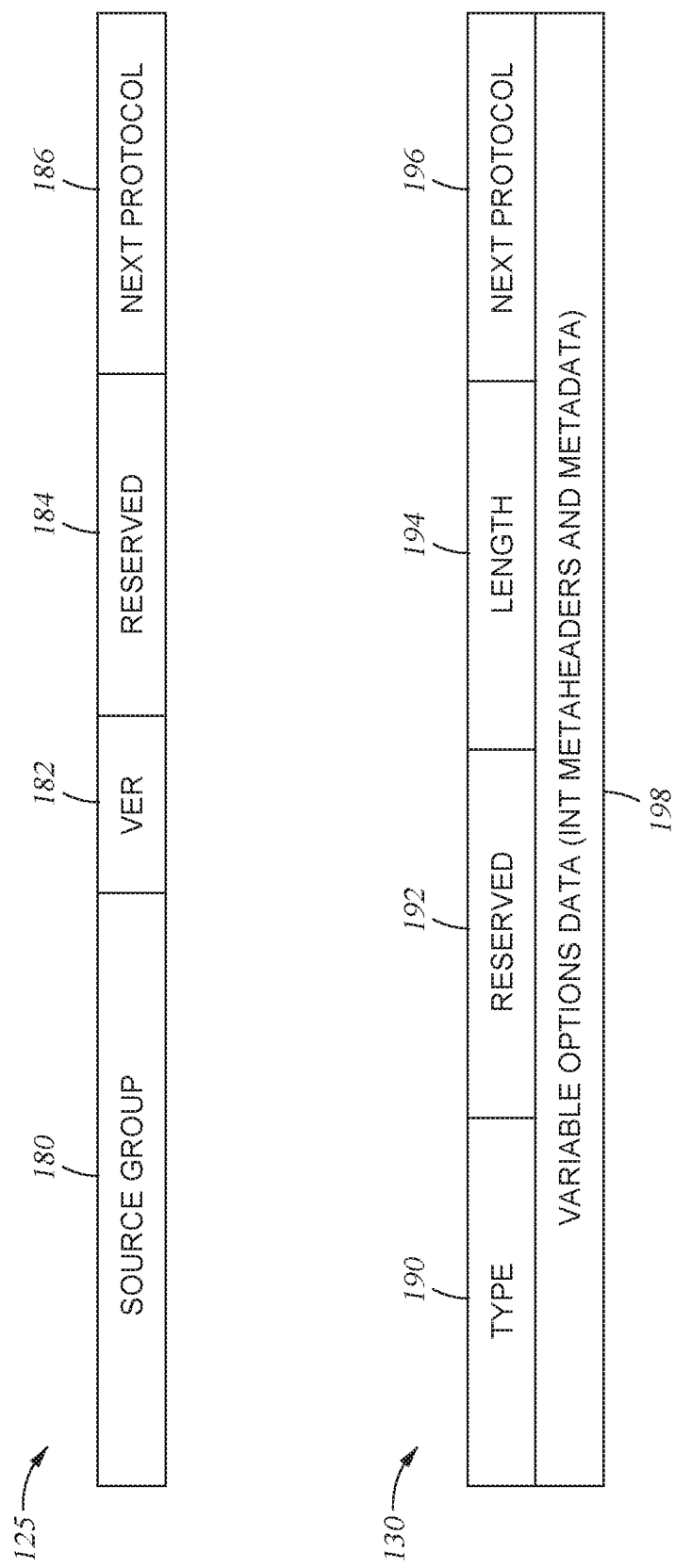
FIG. 1B illustrates a header format for an ACI policy group header and an INT header, according to one embodiment disclosed herein.

One embodiment presented in this disclosure provides a method. The method includes receiving a first packet at a first node in a first logical group of nodes. Upon determining that the first packet was received from a node outside of the first logical group of nodes, the method includes encapsulating the first packet with a first header, wherein the first header indicates a virtual extensible local area network (VXLAN) identifier associated with the first packet, adding a second header to the first packet, wherein the second header indicates a policy group of the first packet, adding a third header to the first packet, wherein the third header stores INT data for the first packet, and adding telemetry data associated with the first node to the third header. Finally, the method includes transmitting the first packet to a second node.

A second embodiment presented in this disclosure provides a computer product. The computer program product includes logic encoded in a non-transitory medium. The logic is executable by operation of one or more computer processors to perform an operation including receiving a first packet at a first node of a first logical group of nodes, and determining a second node to which the first packet is to be sent. Upon determining that the second node is not in the first logical group of nodes, the operation includes adding network telemetry associated with the first node to an INT header of the first packet, extracting network telemetry from the INT header of the first packet, and transmitting the extracted network telemetry to a controller device associated with the first logical group of nodes. Finally, the operation includes transmitting the first packet to the second node.

A third embodiment presented in this disclosure provides a device of a first logical group of devices. The device includes logic encoded in a non-transitory medium. The logic is executable by operation of one or more computer processors to perform an operation including receiving a first packet, and determining a second device to which the first packet is to be sent. Upon determining that the second device is not in the first logical group of devices, the operation includes adding network telemetry associated with the device to an INT header of the first packet, extracting network telemetry from the INT header of the first packet, and transmitting the extracted network telemetry to a controller device associated with the first logical group of devices. Finally, the operation includes transmitting the first packet to the second device.

Example Embodiments

A key aspect of in-band telemetry is that each network node (which may be physical or virtual) appends its own telemetry to the packet (or to a header of the packet) as it traverses the network. Often, this telemetry includes information about the network node itself, such as a unique identifier of the node, as well information about computing resources on the node, such as queue occupancy, buffer status, and the like. This requires that each node have a globally unique identifier. In many fabric deployments, however, nodes are provided unique identifiers within a fabric, but they may or may not be globally unique. Thus, there are no current means to provide telemetry for packets that traverse a network from one fabric (e.g., one logical location) to another. Further, as each node appends its own telemetry, it is possible (and common) to cross the packet header length restriction, due to the number of nodes involved. Embodiments of the present disclosure provide techniques to enable such multi-site telemetry tracking across fabrics, without exceeding packet header length restrictions.

Further, ACI fabric typically requires that each packet carry an indication as to its source class (s-class). For example, in an embodiment, each packet indicates its source group, its policy group, its endpoint group (EPG), or other similar identifier. However, in existing implementations, each packet can carry either s-class information, or INT data, but not both. Thus, there are no current solutions that enable packets within an ACI fabric to carry INT data. Embodiments of the present disclosure provide a new packet format that enables packets traversing an ACI fabric to carry both s-class information and INT data, in separate packet headers.

FIG. 1A illustrates a Packet Format 100 to enable in-band telemetry in ACI fabric, according to one embodiment disclosed herein. Although embodiments of the present disclosure utilize ACI fabric as illustrative, the present disclosure can be readily applied to other network topologies. Embodiments of the present disclosure can generally be utilized to track network telemetry between logical groups of network devices (e.g., between fabrics, data centers, sites, pods, and the like), regardless of the particular arrangement of the network devices, as discussed in more detail below. In the illustrated embodiment of FIG. 1A, the Packet Format 100 includes a variety of headers, including an Outer Ethernet Header 105 (labeled OE 105), an Outer IP Header 110 (labeled OIP 110), a UDP Header 115 (labeled UDP 115), an iVXLAN Generic Protocol Extension (GPE) Header 120 (labeled GPE 120), an ACI Policy Group Header 125 (labeled ACI 125), an INT Header 130 (labeled INT 130), an Inner Ethernet Header 135 (labeled IE 135), an Inner IP Header 140 (labeled IIP 140), a Payload 145, and a Frame Redundancy Check (FRC) Header 150 (labeled FRC 150).

In one embodiment, when a packet is received at an ingress node of a fabric or logical group of devices, it includes an Ethernet header, an IP header, a payload (e.g., the content of the packet), and an FRC header. As illustrated, in some embodiments, the ingress node encapsulates this packet using one or more additional headers. For example, in the illustrated embodiment, this Ethernet header becomes the Inner Ethernet Header 135, and the ingress node adds an Outer Ethernet Header 105. Similarly, in some embodiments, the IP header becomes the Inner IP Header 140, and a new Outer IP Header 110 is added. Further, in some embodiments, the original FRC is revised to a new FRC Header 150, to account for the other new headers.

In existing solutions, a virtual extensible local area network (VXLAN) header or internal VXLAN (iVXLAN) header is used to encapsulate the packet. In some existing solutions, this VXLAN header includes an indication as to the source group or EPG of the node that transmitted the packet. In the illustrated embodiment, however, the packet is encapsulated in an iVXLAN GPE Header 120, as explained in more detail below. Further, in the illustrated embodiment, the source group information is maintained in a separate header, the ACI Policy Group Header 125. Additionally, embodiments of the present disclosure add an INT Header 130 to the packet, to capture network telemetry as the packet traverses one or more logical groups of devices (e.g., fabrics or sites). In one embodiment, the INT Header 130 is an iVXLAN GPE Shim header.

In one embodiment, when the packet reaches an egress node of the fabric (or other logical grouping), the packet is de-encapsulated. That is, in an embodiment, one or more of the outer headers that were added during encapsulation are stripped off, and the original packet is forwarded into the broader network (out of the fabric or other logical group). In some embodiments of the present disclosure, the telemetry contained in the INT Header 130 is transmitted by the egress node to one or more centralized collectors or controllers for analysis, as discussed in more detail below.

In the illustrated embodiment, the VLXAN GPE Header 120 has a variety of fields, including a series of Flags 155, fields that are Reserved 160 and 175 (e.g., bits which do not currently carry useful data), a Next Protocol Field 165, and an iVXLAN Network Identifier (VNID) 170. In the illustrated embodiment, there are eight Flags 155, each of which is one bit in length. Notably, in embodiments of the present disclosure, the "P" Flag 155 is set to one in order to indicate that the Next Protocol Field 165 is present. That is, in an embodiment, setting the "P" flag indicates that it is an iVXLAN GPE header, rather than an ordinary iVXLAN header. Further, in the illustrated embodiment, the Next Protocol Field 165 is eight bits in length, and indicates which header follows the iVXLAN GPE Header 120. In one embodiment, a value of 0x6 indicates that an ACI Group Policy Header 125 follows, and a value of 0x8 indicates that an INT Header 130 follows. Further, in embodiments, a value of 0x1 indicates that an IPv4 header follows, a value of 0x2 indicates that an IPv6 header follows, and a value of 0x3 indicates that an Ethernet header follows. Of course, the values utilized to indicate the next header may be defined differently, depending on the particular implementation.

In the illustrated embodiment, the VNID 170 is a 24-bit field that identifies the VXLAN associated with the packet/source device. As illustrated, the first Reserved area 160 is 16 bits long, and the final Reserved area 175 is eight bits long. In an embodiment, when the packet is encapsulated, the P Flag 155 is set to indicate the presence of the Next Protocol Field 165, and the value of the Next Protocol Field 165 is set to indicate that the next header is the ACI Policy Group Header 125. Further, the VNID 170 is set to indicate the VXLAN to which the packet belongs. Additionally, in some embodiments, the "i" flag is set to indicate that it is an iVXLAN header, as opposed to a VXLAN header.

FIG. 1B illustrates a header format for an ACI Policy Group Header 125 and an INT Header 130, according to one embodiment disclosed herein. In the illustrated embodiment, the ACI Policy Group Header 125 includes a field for the Source Group 180, Version 182 (labeled VER 182), a Reserved space 184, and a Next Protocol field 186. In an embodiment, the Source Group 180 is a 16-bit long field which identifies the s-class, EPG, policy group, or source group of the packet. That is, in one embodiment, the Source Group 180 identifies the defined group to which the source node (e.g., the device, the workload, etc.) that original transmitted the packet belongs. In embodiments, each EPG is associated with one or more policies regarding how packets should be handled in the fabric (e.g., with respect to security, forwarding, routing, and the like). Thus, the Source Group 180 identifies the set of policies that are to be applied when processing the packet.

In the illustrated embodiment, the Version 182 is a 2-bit field that indicates the version number of the packet (e.g., the version of the policy group, or the format used). Further, as illustrated, the Reserved 184 is a 6-bit field that is set to zero on ingress into the fabric, and ignored thereafter. Finally, the Next Protocol Field 186 is an 8-bit field that indicates the type of header that follows the ACI Policy Group Header 125. For example, in the illustrated embodiment of FIG. 1A, if the packet includes an INT header, the Next Protocol Field 186 is set to a value which indicates that an INT Header 130 follows.

As illustrated, the INT Header 130 includes a Type 190, a Reserved space 192, a Length 194, Next Protocol 196, and Variable Options Data (including INT metaheaders and metadata) 198. In an embodiment, the Type 190 refers to the type of the INT Header 130, and the Length 194 indicates the total length of the INT data. In embodiments, the INT data can include switch or node-level information such as an identifier of the switch or node that added the telemetry, ingress information such as the ingress port ID and the timestamp of the ingress, as well as egress information such as the egress port ID, the latency of the node (e.g., how long it took for the packet to be routed within the device), the egress port utilization, and the like. Further, in some embodiments, the INT data includes buffer information such as queue occupancy, queue congestion status, and the like. In embodiments, any type of telemetry can be gathered and stored in the Variable Options Data 198, depending on the particular implementation.

In one embodiment, when the packet is received by a node, ingress telemetry is appended to the INT Header 130. Similarly, as the packet exits the node, egress telemetry is added. In some embodiments, only certain nodes operate on the INT Header 130, and the remaining devices ignore it. In one embodiment, only nodes at the boundary of the logical group operate on the INT Header 130. For example, in one embodiment, when a packet is received at a node in the fabric, the node determines whether the immediately prior node that sent the packet is in the logical group (e.g., in the fabric) or not. In embodiments, this determination can be made by identifying the prior node, analyzing the packet (e.g., to determine if it is already encapsulated), based on the port the packet was received on, and the like. If the prior node is not a part of the fabric, the node acts as an ingress node to the fabric, with respect to the received packet. Similarly, in some embodiments, at egress from the particular node, the node determines whether the next node is a part of the fabric. If not, the node is acting as an egress node from the fabric, with respect to the packet.

In some embodiments, ingress nodes and egress nodes (e.g., nodes at the boundary of the logical group or fabric) append INT data to the INT Header 130, while all other nodes (e.g., intermediate nodes or transit nodes within the fabric) do not, and simply forward the packet. In this way, embodiments of the present disclosure enable the path of the packet to be tracked based on the boundaries it crosses between sites. This allows administrators to quickly determine the sites, fabrics, or physical locations that the packet traversed, without concern for the routing that occurred within each site or fabric. This can aid the user's understanding of the packet flow. For example, if a large number of packets are traversing between two sites, the administrator can determine that one or more of the workloads at the second site should be relocated to the first site, in order to reduce external network traffic and delay.

In an embodiment, because the internal routing within each fabric is not recorded, the administrator can more easily focus on these multi-site packets, to better optimize the network utilization (e.g., to reduce inter-site traffic and congestion). This telemetry is additionally useful for troubleshooting purposes (to identify the path of the packet). Further, this multi-site telemetry is useful for network planning and optimization, such as to provide insight as to the required bandwidth capacity between pods, sites, or fabrics. In the illustrated embodiment, the Next Protocol 196 is set to indicate that the next header is an Ethernet header (e.g., the Inner Ethernet header 135).

In some embodiments, the iVXLAN GPE Header 120 and ACI Policy Group Header 125 remain with the packet as it is routed between various sites or pods. In such an embodiment, the iVXLAN GPE Header 120 and ACI Policy Group Header 125 are stripped from the packet only at the final node in the logical group (e.g., pod or site) where the destination is attached, as discussed in more detail below. Further, in some embodiments, if the source and destination of a packet are both attached to the same logical group, the packet is encapsulated with an iVXLAN GPE Header 120 and ACI Policy Group Header 125, but not an INT Header 130, as discussed in more detail below. In one embodiment, the packet is encapsulated with an INT header as soon as it is determined that the packet is to be routed to or through another logical group, as discussed in more detail below.

Figure 2:
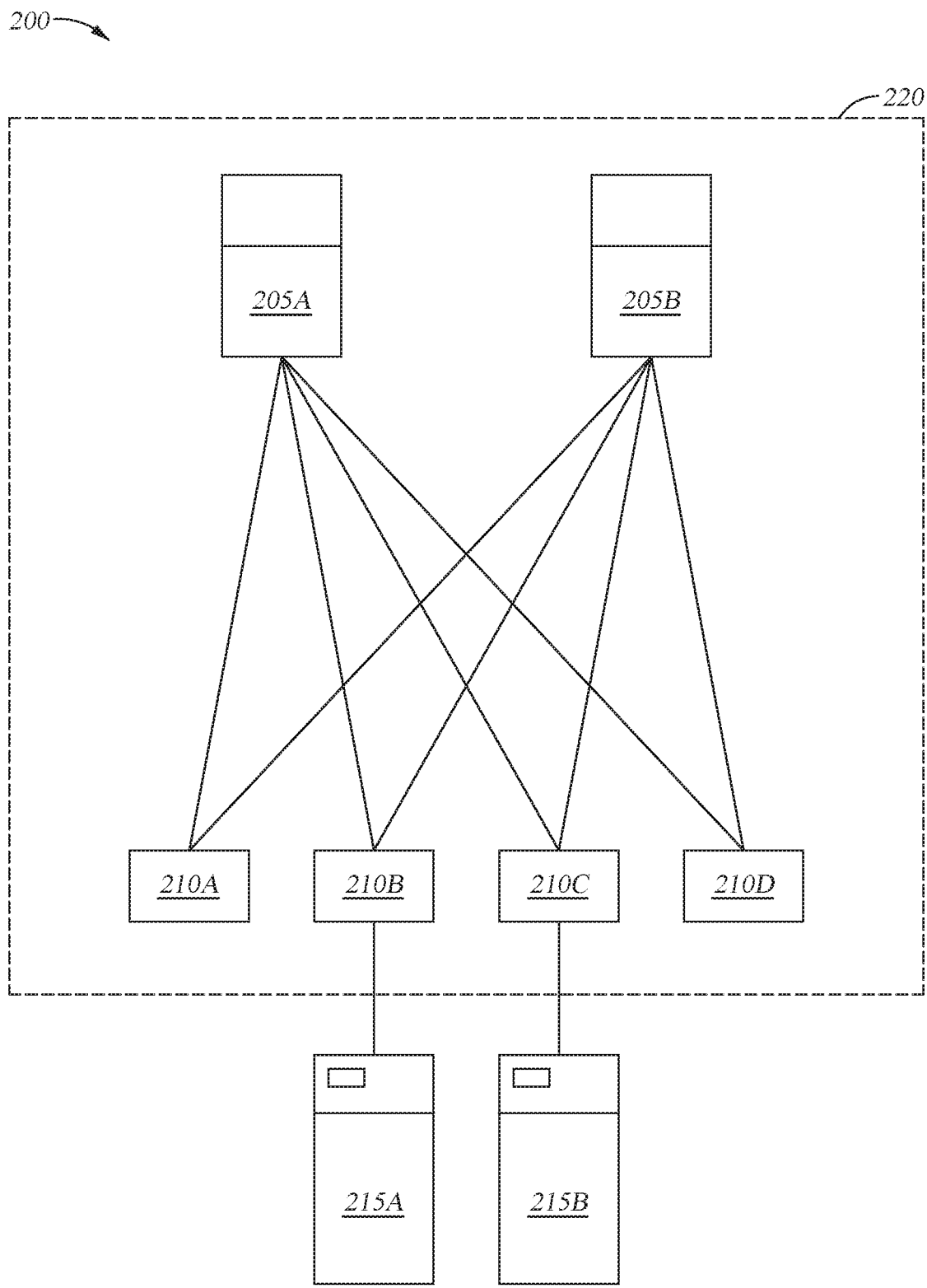
FIG. 2 illustrates a system including a fabric configured to implement in-band telemetry, according to one embodiment disclosed herein.

FIG. 2 illustrates a system 200 including a Fabric 220 configured to implement in-band telemetry, according to one embodiment disclosed herein. In the illustrated embodiment, the Fabric 220 utilizes a leaf-spine topology, where each Leaf 210 is connected to each Spine 205. In an embodiment, a leaf node is a node that is directly attached or connected to one or more workloads, while a spine node is a node that directly connects to one or more leaves to provide interconnectivity therein. Further, in embodiments, a spine node can also be communicatively coupled to one or more other logical groups (e.g., other Fabrics 220), or to one or more other networks.

Further, as illustrated, no two Leaves 210 are directly connected (e.g., without requiring data to pass through a Spine 205), and no two Spines 205 are connected (e.g., without requiring data to pass through a Leaf 210). In one embodiment, the Fabric 220 is a logical domain or group of devices. In one embodiment, the Fabric 220 is an ACI site or pod. Additionally, as illustrated, the system 200 includes two Workloads 215A-B, which are attached at respective Leaves 210B-C. In embodiments, the Workloads 215 may be physical devices such as servers, or virtual nodes such as workloads, virtual machines, logical partitions, applications, and the like.

Although the illustrated Fabric 220 includes a connection from each Leaf 210 to every Spine 205, in some embodiments, the Fabric 220 may not be fully connected. For example, in some embodiments, one or more Leaves 210 are not connected to every Spine 205 (e.g., one or more Spines 205 may be present to which the Leaf 210 is not directly connected). Similarly, in embodiments, one or more Spines 205 may lack connections to one or more Leaves 210. In one embodiment, the Spines 205A-B and Leaves 210A-D collectively make up a logical grouping of devices referred to herein as a Fabric 220. In one embodiment, this logical group is defined by a common control plane for the nodes. For example, in one embodiment, each of the Spines 205A-B and Leaves 210A-D are controlled by one or more application policy infrastructure controllers (APIC) that provide centralized access to fabric information and optimize scale and performance of the Workloads 215.

In some embodiments, two or more sites or pods can be combined into a single Fabric 220 based on this shared control plane. For example, the individual APICs of each pod can work together to unify the control of the pods or sites. In some embodiments, the Fabric 220 is connected to a broader network (e.g., the Internet) or to other logical groups of devices through one or more of the Spines 205 and/or Leaves 210. In the illustrated embodiment, when a Workload 215 or other node transmits a packet into the Fabric 220, the corresponding Leaf 210 or Spine 205, acting as the ingress node, encapsulates the packet as discussed above. Although two Workloads 215A-B are illustrated, in embodiments, any number of Workloads 215 may be present. Further, in embodiments, each Leaf 210 may be associated with zero, one, or more than one Workloads 215 at any given time. In some embodiments, administrators can move the Workloads 215 to better allocate resources and optimize traffic.

For example, if the Workload 215A wishes to transmit a packet to the Workload 215B, in an embodiment, the Workload 215A generates and transmits the packet to Leaf 210B. Leaf 210B then determines that it is the ingress node for the packet, because the immediately prior node (Workload 215A) is not included in the Fabric 220. In one embodiment, the Leaf 210B determines it is the ingress node based on determining that the packet was received directly from the source Workload 215A. As such, the Leaf 210b encapsulates the packet by adding at least a iVXLAN GPE Header 120 and an ACI Policy Group Header 125. Notably, while being processed within the Fabric 220, in one embodiment, each node in the Fabric 220 accesses the ACI Policy Group Header 125 to determine the EPG of the packet and the corresponding policies that are to be implemented when processing the packet. In one embodiment, the Leaf 210B determines that the packet will not cross a border into any other logical groups, because Workload 215B is attached to a different leaf in the same logical group. In an embodiment, based on this determination, the Leaf 210B does not add an INT Header 130 to the packet.

In some embodiments, the determination as to whether an INT Header 130 should be added is made when it is determined whether the packet will cross a logical boundary. In some embodiments, this determination can be made by the ingress leaf node. For example, in a unicast flow, the ingress leaf can make this determination. In some embodiments, however, this determination is made by the spine. For example, in a multicast flow, the leaf may be unable to determine whether the packet will be forwarded outside of the Fabric 220. In such an embodiment, the leaf node can nevertheless encapsulate the packet with an iVXLAN GPE Header 120 and ACI Policy Group Header 125, and the spine can add an INT Header 130 if the packet is to leave the Fabric 220, as discussed in more detail below.

The Leaf 210B then performs routing or switching on the packet to determine the next node. In order to transmit the packet to Workload 215B, the Leaf 210B can select either Spine 205A or 205B. In one embodiment, the Leaf 210B performs load balancing to select one of the Spines 205A or 205B. Regardless of which Spine 205A-B is selected, when the packet is received at the next node (e.g., at Spine 205A or 205B), the Spine 205 determines that it is not the ingress node for the packet. For example, in one embodiment, the Spine 205 determines that the prior node, Leaf 210A, is in the Fabric 220. In other embodiments, the Spine 205 determines that the packet is already encapsulated. In still another embodiment, the Spine 205 determines that it is not the ingress node because the port over which the packet was received is associated with one or more in-fabric nodes. In an embodiment, therefore, the Spine 205 refrains from operating on the INT Header 130 (if present) of the packet (e.g., refrains from adding data to it) based on this determination. Further, in an embodiment, the Spine 205 does not add an INT Header 130, based on determining that the destination Workload 215B is attached to the Fabric 220 (e.g., that the packet will not traverse a logical boundary into another logical group).

Further, in some embodiments, the Spine 205 routes or switches the packet to determine the next node. In the illustrated embodiment, the next node is Leaf 210C. In an embodiment, because this next node is also within the Fabric 220, the Spine 205 additionally refrains from adding egress telemetry to the packet. Thus, the Spine 205 forwards the packet as a normal packet (as opposed to an INT packet), and ignores the INT Header 130 (if present). When the packet is received by the Leaf 210C, in an embodiment, a similar process is completed to determine that the prior node (Spine 205A or 205B) is within the same logical group as the Leaf 210C (e.g., within the Fabric 220). As such, in an embodiment, the Leaf 210C does not append ingress data for the node (if an INT Header 130 is present).

However, after routing and switching, the Leaf 210C determines that the next node is the destination Workload 215B, which is outside of the Fabric 220. Thus, in an embodiment, the Leaf 210C adds egress telemetry to the INT Header 130 of the packet, if present. In one embodiment, this comprises data such as the identifier of the Leaf 210C, as well as the egress port, queue occupancy, and the like. In some embodiments, the Leaf 210C also appends data regarding ingress to the Leaf 210C, and/or processing within the Leaf 210C. In some embodiments, the telemetry includes an indication as to the boundary nodes and site or fabric identity, without additional computing information.

Finally, before transmitting the packet to the Workload 215B, in an embodiment, the Leaf 210C de-encapsulates the packet. In one embodiment, de-encapsulating the packet comprises removing one or more of the headers (such as the iVXLAN GPE Header 120, ACI Policy Group Header 125, and INT Header 130 if present). In some embodiments, if the packet includes an INT Header 130, the Leaf 210C, as egress node, retrieves or extracts the INT data from the INT Header 130, and transmits it to one or more centralized collectors or controllers (such as the APIC responsible for the Fabric 220) for processing. In this way, administrators can review the telemetry for the packet to determine the node and port it entered the Fabric 220 on, as well as the node and port it exited the Fabric 220 on. In some embodiments, the Spine 205 removes the INT Header 130 from the packet upon determining that the destination Workload 215B is attached to the Fabric 220. Thus, in some embodiments, the Spine extracts the telemetry data and transmits it to the centralized collector(s), and the Leaf 210C de-encapsulates the packet by removing the iVXLAN GPE Header 120 and the ACI Policy Group Header 125.

Figure 3:
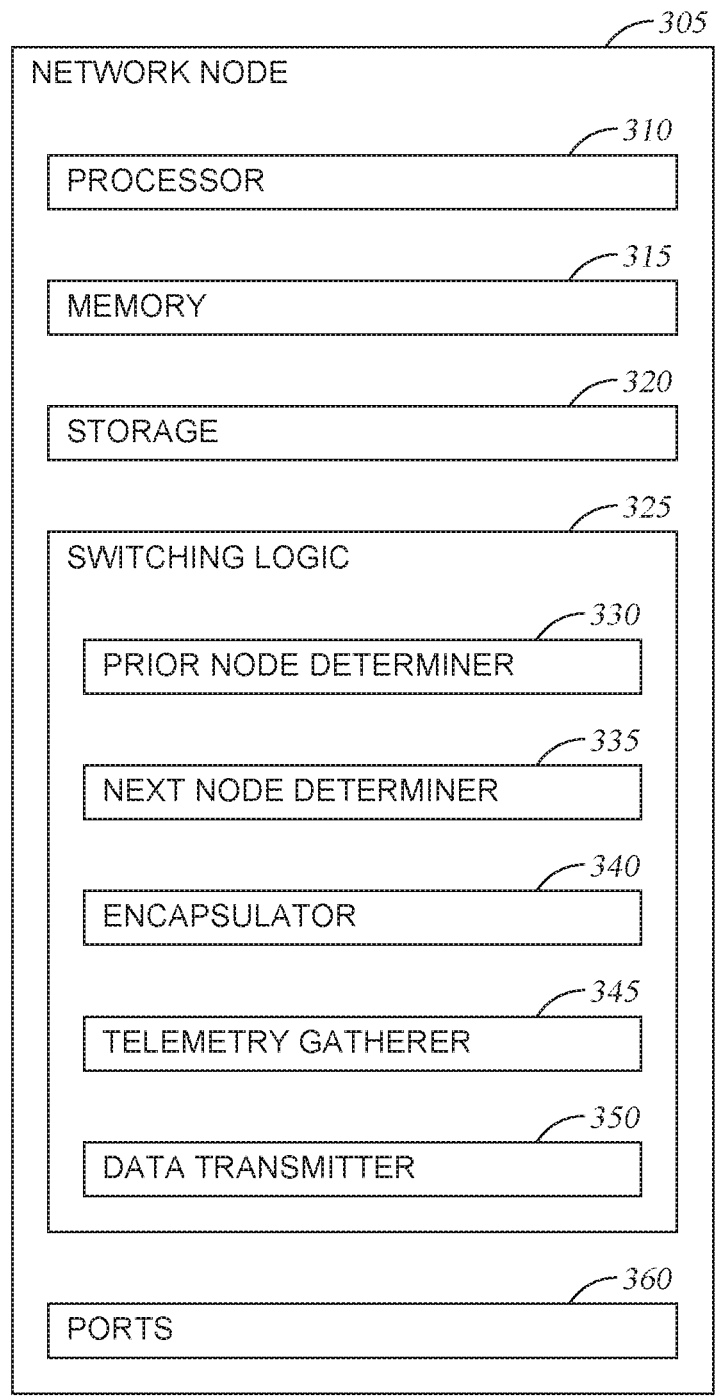
FIG. 3 is a block diagram illustrating a network node configured to implement in-band telemetry, according to one embodiment disclosed herein.

FIG. 3 is a block diagram illustrating a Network Node 305 configured to implement in-band telemetry, according to one embodiment disclosed herein. In one embodiment, the Network Node 305 is a Leaf 210 or Spine 205 in a logical group of devices (e.g., a fabric deployment). In one embodiment, the logical group is an ACI fabric. In the illustrated embodiment, the Network Node 305 includes a Processor 310, a Memory 315, Storage 320, Switching Logic 325, and one or more Ports 360. In the illustrated embodiment, Processor 310 retrieves and executes programming instructions stored in Memory 315 as well as stores and retrieves application data residing in Storage 320. Processor 310 is representative of a single CPU, multiple CPUs, a single CPU having multiple processing cores, and the like. Memory 315 is generally included to be representative of a random access memory. Storage 320 may be a disk drive or flash-based storage device, and may include fixed and/or removable storage devices, such as fixed disk drives, removable memory cards, or optical storage, network attached storage (NAS), or storage area-network (SAN). Through the Ports 360, the Network Node 305 may be communicatively coupled with other devices, such as other network nodes, databases, controllers, and the like.

In the illustrated embodiment, the Switching Logic 325 handles routing of packets through the Network Node 305. In embodiments, the Switching Logic 325 is logic encoded in a non-transitory medium (e.g., encoded in software stored in memory or storage, or encoded via one or more hardware components). In one embodiment, the Switching Logic 325 is implemented through software (e.g., as an application stored in Memory 315). In other embodiments, the Switching Logic 325 is implemented using one or more integrated circuits, such as an application-specific integrated circuit (ASIC). In some embodiments, the Switching Logic 325 is a mixture of hardware and software. In the illustrated embodiment, when packets are received via one or more Ports 360, they are processed according to the Switching Logic 325.

In the illustrated embodiment, the Switching Logic 325 includes a Prior Node Determiner 330, a Next Node Determiner 335, an Encapsulator 340, a Telemetry Gatherer 345, and a Data Transmitter 350. Although illustrated as discrete components to aid understanding, in embodiments, the operations performed by each component can be combined or distributed across any number of components, as well as across software, hardware, or a combination of software and hardware. In the illustrated embodiment, the Prior Node Determiner 330 and Next Node Determiner 335 identify the immediately prior and subsequent nodes in the network path, respectively. In some embodiments, the Prior Node Determiner 330 and Next Node Determiner 335 also determine whether the corresponding node is included in the same logical group as the Network Node 305 (e.g., in the same fabric). In this way, the Network Node 305 determines, with respect to each INT packet received, whether it is an ingress node, an egress node, or a transit node within the fabric.

In some embodiments, some packets are encapsulated and routed through the fabric without an INT Header 130. In one embodiment, whether or not an INT Header 130 is associated with a given packet is determined based on data associated with the packet (e.g., an indication as to whether telemetry should be tracked), a configuration of the ingress node (e.g., a filter set by an administrator to track telemetry for specified flows), or via other means. In such an embodiment, telemetry is only gathered for packets designated as INT packets. In some embodiments, however, all packets are processed to determine whether the Network Node 305 is an ingress, egress, or transit nodes. For example, in one embodiment, even non-INT packets are still encapsulated and de-encapsulated. In some embodiments, non-INT packets are encapsulated with a VXLAN or iVXLAN header. In other embodiments, non-INT packets are still encapsulated with an iVXLAN GPE Header 120 and ACI Policy Group Header 125. In one embodiment, packets having an ordinary iVXLAN header have their source group information included within the iVXLAN header, while GPE packets have a separate ACI Policy Group Header 125.

As illustrated, if the Network Node 305 determines that it is an ingress node into the multi-domain deployment (e.g., because the Prior Node Determiner 330 determined that the immediately prior node is not a part of the logical group, based on the port the packet was received on, or based on the headers associated with the packet), the Encapsulator 340 encapsulates the packet as discussed above. In some embodiments, only leaf nodes add and remove iVXLAN GPE Headers 120 and ACI Policy Group Headers 125, while leaves or spines may add and remove INT Headers 130. In some embodiments, if telemetry is to be tracked for the packet, the Encapsulator 340 generates an INT Header 130, and inserts it into the packet headers. In some embodiments, as discussed above, this INT Header 130 is added based on determining that the packet will be forwarded through one or more other logical groups or fabrics, as discussed in more detail below.

Further, in an embodiment, if the Network Node 305 is an ingress node and telemetry data is to be gathered, the Telemetry Gatherer 345 collects the indicated telemetry (e.g., as specified by a configuration) and appends the INT Header 130 with this telemetry data. Additionally, in the illustrated embodiment, if the Next Node Determiner 335 determines that the Network Node 305 is an egress node for the packet (e.g., because the next node is outside of the fabric), the Telemetry Gatherer 345 gathers the specified egress telemetry and appends the INT Header 130. Further, if the Network Node 305 is an egress node, in the illustrated embodiment, the Encapsulator 340 also acts as a de-encapsulator to strip off one or more of the added headers, in order to expose the underlying packet.

In some embodiments, the Data Transmitter 350 proceeds to forward the packet via one or more Ports 360. In an embodiment, the Port(s) 360 are selected based on the determined routing or switching, load balancing, and the like. Further, in some embodiments, if the Network Node 305 is an egress node from the fabric (e.g., the next node is the destination) with respect to the flow/packet, the Data Transmitter 350 extracts the telemetry data from the removed INT Header 130, and transmits it to one or more centralized collection devices or controllers. In an embodiment, telemetry data can thus be collected from each site, fabric, pod, or deployment for each flow or packet. Administrators can thereby determine which flows or workloads are sending packets across the broader network between multiple fabrics, as well as the volume of these multi-site flows.

Figure 4:
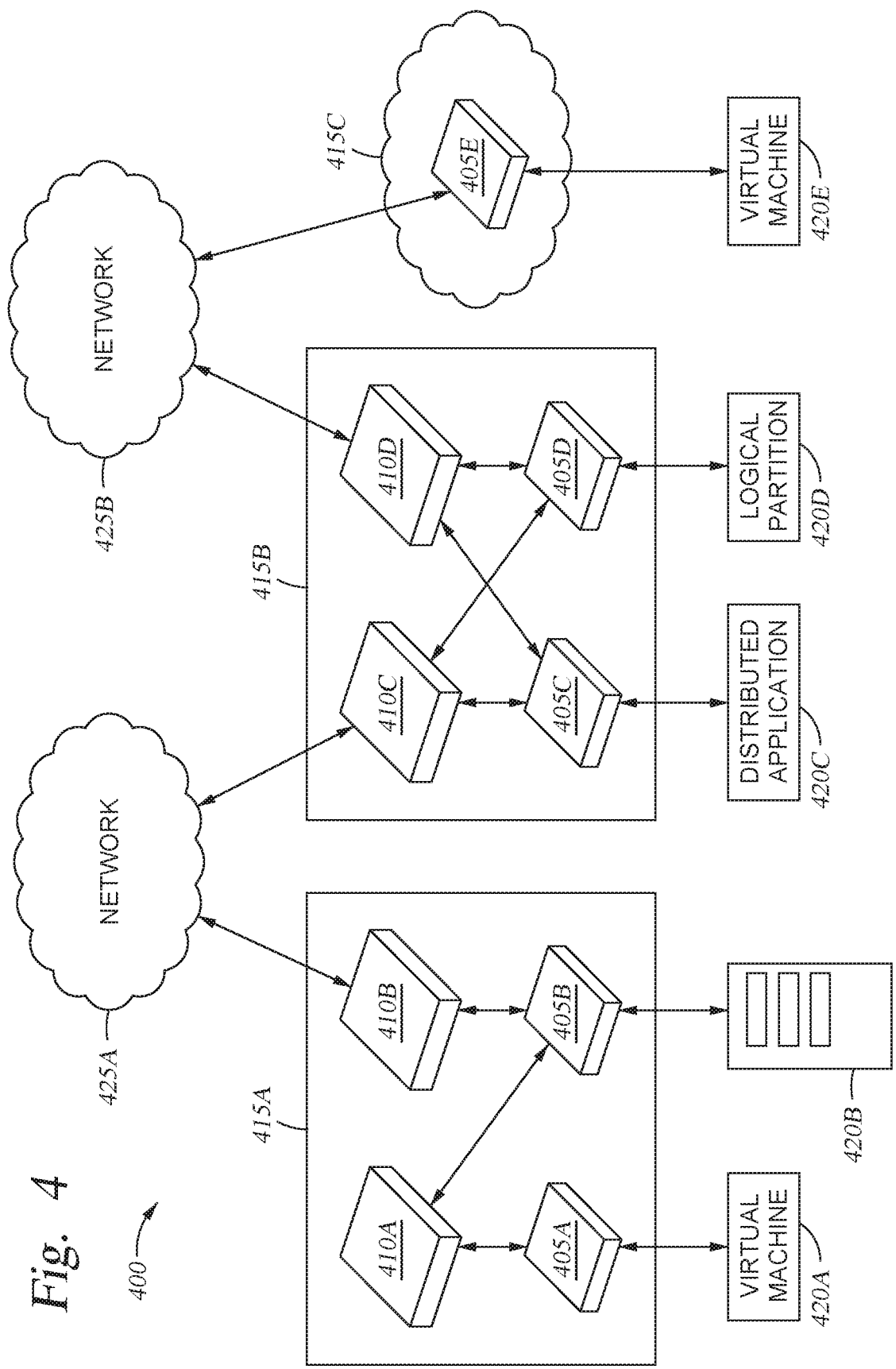
FIG. 4 illustrates a multi-site fabric deployment, according to one embodiment disclosed herein.

FIG. 4 illustrates a Multi-Site Fabric Deployment 400, according to one embodiment disclosed herein. In the illustrated embodiment, the Multi-Site Fabric Deployment 400 includes three logical groups of devices/fabrics: two Sites 415A and 415B, as well as a Remote Leaf 405E. In an embodiment, although the Sites 415A-B and Remote Leaf 405E are communicatively coupled (e.g., through Networks 425A and 425B), they are each a distinct logical group of nodes, because they do not have a shared control plane. That is, in an embodiment, each of the sites can be controlled independently, such that each site is its own fabric. In some embodiments, the Sites 415A and 415B may have the same controller, but with differing control planes (e.g., differing policies and configurations). Although illustrated as a Multi-Site Fabric Deployment 400 with Sites 415A and 415B, in embodiments, the deployment may also be a multi-pod deployment, with Pods 415A and 415B.

In one embodiment, whether it is a multi-site or multi-pod deployment depends on the particular configuration (e.g., whether the logical groups are controlled by separate APICs or a single cluster of APICs). Regardless, embodiments of the present disclosure can be used with any deployments that include any type of logical groupings or domains. For example, in embodiments, the deployment can include pods, sites, fabrics, virtual pods, virtual sites, cloud pods or sites, endpoints deployed in the cloud, and the like.

In the illustrated embodiment, the Site 415A includes two Leaves 405A-B, and two Spines 410A-B. Further, the Site 415A is associated with two Workloads 420A-B. As illustrated, the Workload 420A is a virtual machine, and the Workload 420B is a server. Additionally, as illustrated, the Leaf 405A is coupled with the Spine 410A, but not with the Spine 410B. Further, the Leaf 405B is coupled with both Spines 410A and 410B. In the illustrated embodiment, the Spine 410B is connected to the Network 425A. In one embodiment, the Network 425A is the Internet. In some embodiments, the Networks 425A and 425B are the same network, or are connected together. In other embodiments, one or both the Networks 425A and 425B are private networks, disconnected networks, or dedicated communications links between the sites and remote leaf.

Further, in the illustrated embodiment, the Site 415B includes two Leaves 405B-C, and two Spines 410C-D. The Site 415B is also associated with two Workloads 420C-D. As illustrated, the Workload 420C is a distributed application, and the Workload 420D is a logical partition. Additionally, as illustrated, both of the leaves 405C-D are communicatively coupled with both of the Spines 410C-D. Further, in the illustrated embodiment, the Spine 410C is connected to the Network 425A and Network 425B. In the illustrated embodiment, the Remote Leaf 405E is associated with a single Workload 420E, which is a virtual machine. The Remote Leaf 405E is coupled with the Network 425B.

In one embodiment, node identifiers within each Site 415A-B are defined by the respective controller for the Site 415A-B (e.g., the APIC). Further, in an embodiment, the site or pod ID of each Site 415A-C is defined by a centralized controller such as a multi-site controller. In this way, each node can be uniquely identified by its site ID, pod ID, and/or node ID. In some embodiments, the telemetry data appended to INT packets by each node include an indication as to the type of the pod, the site ID, the pod ID within the given site, and the node ID. In one embodiment, the type of pod is three bits, and indicates a physical pod, a virtual pod, a remote leaf, a cloud deployed pod, or "other." Further, in one embodiment, the site ID and pod ID are each eight bits, and the node ID is twelve bits. In an embodiment, each site ID and pod ID are globally unique in the Multi-Site Fabric Deployment 400. Further, in an embodiment, each node ID is unique within a particular pod or site, but is not necessarily globally unique with respect to the overall Multi-Site Fabric Deployment 400. In an embodiment, each Site 415 may contain any number of logical pods, each containing any number of network nodes, in order to isolate failure domains.

In some embodiments, as discussed above, packet telemetry can be recorded at the boundary between logical domains, but is not collected within each site or fabric. For example, suppose the Workload 420A transmitted a packet to the Workload 420E. In the illustrated embodiment, Leaf 405A, upon receipt of the packet, encapsulates it with an iVXLAN GPE Header 120 and ACI Policy Group Header 125. In some embodiments, based on determining that the destination is associated with, attached to, or on another logical group or domain (e.g., the Remote Leaf 405E), the Leaf 405A also adds telemetry regarding the ingress into the Site 415A. The packet is then forwarded to Spine 410A, and then to Leaf 405B. Notably, because the Spine 410A is an internal transit node within the Site 415A, with respect to the packet flow, it refrains from operating on the INT header of the packet (e.g., refrains from adding telemetry to it).

In some embodiments, as discussed above, the Spine 410A, rather than the Leaf 405A, may determine that the packet is destined for a different logical grouping. In such an embodiment, the Spine 410A receives the encapsulated packet from the Leaf 405A, adds the INT Header 130, and adds telemetry data associated with the Spine 410A to the INT Header 130. The Spine 410A then forwards the packet to the Leaf 405B.

In embodiments, the Leaf 405B determines that it is an internal or intermediate node, and similarly refrains from adding any data to the INT Header 130 of the packet. The Leaf 405B then forwards the packet to Spine 410B. Upon determining that it is acting as the egress point from the Site 415A, the Spine 410B appends egress telemetry to the packet. In embodiments, the Spine 410B forwards the packet to the Spine 410C, via the Network 425A. In embodiments, the packet retains its iVXLAN GPE Header 120, ACI Policy Group Header 125, and INT Header 130.

When the packet is received at Spine 410C in Site 415B, the Spine 410C determines that it is acting as the ingress node for the packet into Site 415B, and adds its own ingress telemetry data to the INT Header 130. Further, upon determining that the Spine 410C is also the egress node from the logical group (e.g., from Site 415B), the Spine 410C further adds egress telemetry to the packet header, and forwards it across the Network 425B to the Remote Leaf 405E.

Finally, the packet is received by the Remote Leaf 405E. As the ingress node, the Leaf 405E encapsulates the packet and adds ingress telemetry to the logical grouping. Similarly, as the next node is the destination Workload 420E, the Leaf 405E adds egress telemetry. In one embodiment, upon determining that the next node is the destination, the Remote Leaf 405E de-encapsulates the packet by removing the iVXLAN GPE Header 120, ACI Policy Group Header 125, and INT Header 130, and forwards it to the Workload 420E. In an embodiment, the Leaf 405E also extracts and transmits the telemetry data from the INT Header 130 to the centralized controller. As discussed above, in one embodiment, the telemetry data includes an indication as to the site, pod, and boundary node(s) that the packet passed through.

Once this telemetry is collected, the central controller can determine that the packet entered Site 415A and exited at Spine 410B, entered and exited Site 415B at Spine 410C, and finally entered and exited the Remote Leaf 405E. Based on this data, administrators can better understand which sites the packet visited, the order of these sites, and the particular nodes involved at the boundaries, without concern for the internal transit nodes of each site. This allows a deeper understanding of the network traffic across the Networks 425A and 425B, which can inform deployment decisions. For example, the Workloads 420A and 420E may operate more efficiently, or with reduced network traffic and latency, if they are both located within the same site.

Depending on the latency introduced and the congestion in the Networks 425A and 425B, an administrator may therefore relocate one or both Workloads 420A and 420E. In some embodiments, the workloads are automatically relocated by one or more controllers. For example, in one embodiment, if the amount of traffic (e.g., the number of packets) between two or more sites exceeds a predefined threshold, the controller may determine to relocate (or provide a suggestion to relocate) one or both workloads to reduce this inter-site traffic. Similarly, in some embodiments, the controller(s) further consider the latency and congestion of the inter-site link(s), and other similar network data.

In some embodiments, in addition to the routing and processing discussed above, each node also determines the source group for the packet (e.g., based on the ACI Policy Group Header), and identifies one or more policies associated with the group. The processing of the packet at the node may then be accomplished based on part on those policies. For example, in an embodiment, the policies can include routing or switching rules, security policies, a priority of the packet or flow, and the like.

As additional example, suppose the Workload 420A transmits a packet to the Workload 420B. In an embodiment, upon receiving the packet, the Leaf 405A encapsulates it with an iVXLAN GPE Header 120 and ACI Policy Group Header 125. In one embodiment, as discussed above, the Leaf 405A determines that the destination Workload 420 is associated with the same logical group (e.g., Site 415A), and therefore refrain from adding an INT Header 130 to the packet. In some embodiments, however, this determination is made by the Spine 410A. The Leaf 405A then forwards the packet to the Spine 410A. In an embodiment, because the packet is destined for the Workload 420B, the Spine 410A similarly refrains from adding an INT Header 130, and forwards the packet to the Leaf 405B. The Leaf 405B, upon determining that it is the egress node (e.g., because the packet will leave the fabric and be forwarded to a device or node outside of any of the logical domains), the Leaf 405B de-encapsulates the packet by removing the iVXLAN GPE Header 120 and ACI Policy Group Header 130, and forwards it to the Workload 420B.

In this way, embodiments of the present disclosure enable telemetry data to be collected and carried in the packet only if the packet will traverse one or more boundaries between logical domains. Further, in an embodiment, the telemetry data is collected only for indicated or specified flows or packets, as discussed above. Additionally, in some embodiments, even if a packet traverses multiple sites or pods, telemetry data is only gathered at the boundary between such logical groups, as discussed above.

Figure 5:
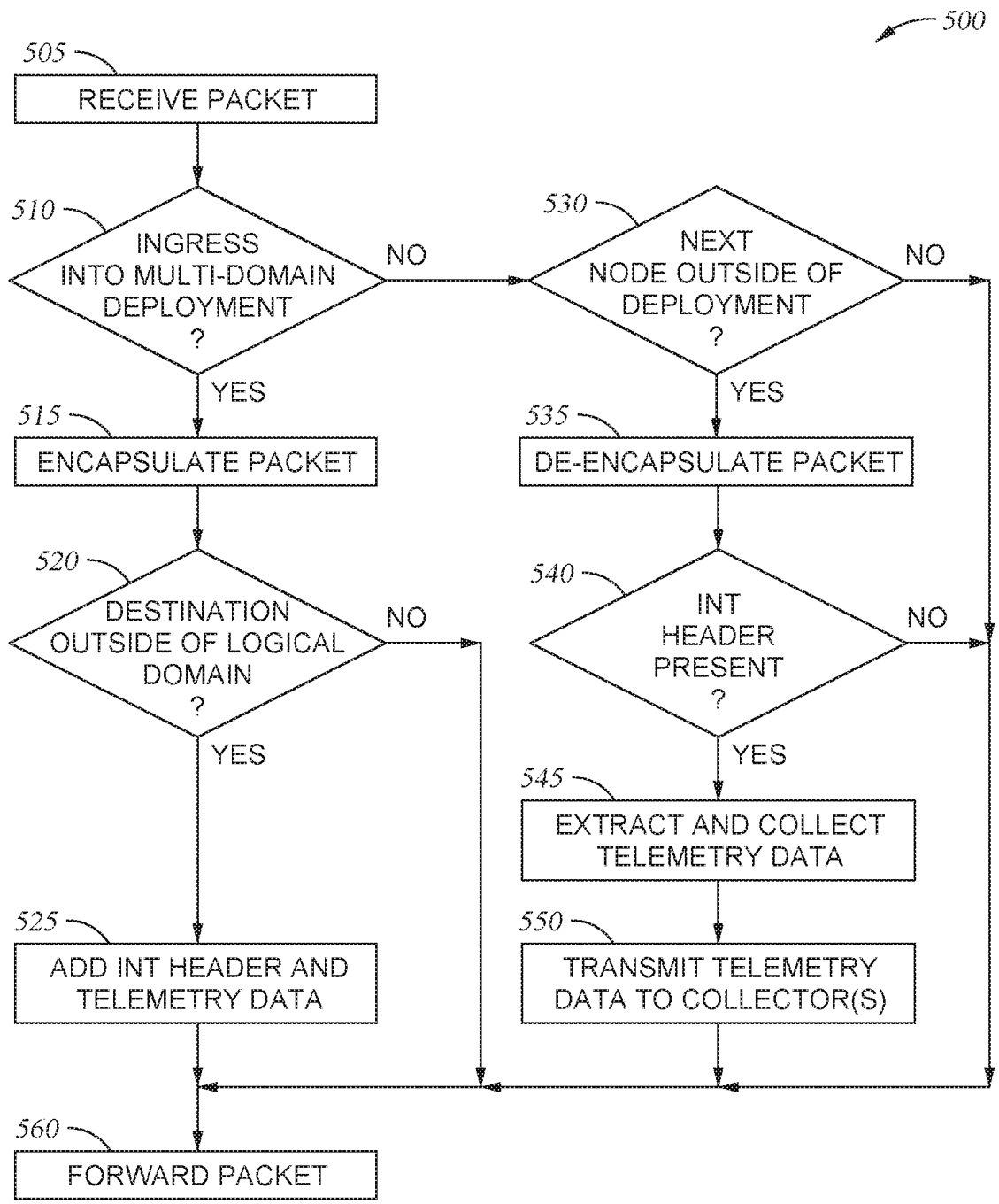
FIG. 5 is a flow diagram illustrating a method of routing packets in a multi-site fabric deployment, according to one embodiment disclosed herein.

FIG. 5 is a flow diagram illustrating a method 500 of routing packets in a multi-site fabric deployment, according to one embodiment disclosed herein. In an embodiment, the method 500 is performed by Leaves 405. The method 500 begins at block 505, where the Leaf 405 receives a packet. In embodiments, this packet may be received from a Workload 420 attached to the Leaf 405, or from a Spine 410 associated with the logical domain of the Leaf 405. The method 500 proceeds to block 510, where the Leaf 405 determines whether it is the ingress node into the multi-domain deployment. That is, the Leaf 405 determines whether the packet was received from a Workload 420, as opposed to a Spine 410. In one embodiment, this determination comprises determining whether the packet is already encapsulated (e.g., with an iVXLAN GPE Header 120 and ACI Policy Group Header 125). In one embodiment, if the packet is to be transmitted to another Workload 420 that is also attached to the Leaf 405, the Leaf 405 determines that the packet is not entering the deployment, as it can be immediately forwarded to the destination without being encapsulated or forwarded into the fabric.

If the Leaf 405 determines that it is the first node in the deployment (e.g., the packet is not yet encapsulated for the multi-domain deployment), the method 500 proceeds to block 515, where the Leaf 405 encapsulates the packet. In the illustrated embodiment, at block 520, the Leaf 405 determines whether the destination of the packet is outside of the current logical domain of the Leaf 405 (e.g., whether the destination Workload 420 is associated with a different site, fabric, or pod). If so, this indicates that the packet will traverse at least one border between logical domains or groupings of devices. In such a case, the method 500 proceeds to block 525, where the Leaf 405 adds an INT Header 130 to the packet. Further, as illustrated, the Leaf 405 collects telemetry data regarding its operations, and adds this data to the INT Header 130. The method 500 then proceeds to block 560, where the packet is forwarded to the next node (e.g., to a Spine 410).

Of course, as discussed above, in some embodiments, the Leaf 405 cannot or does not determine whether to add the INT Header 130. In some embodiments, this operation is performed by a Spine 420. In such an embodiment, the method 500 skips block 520, and proceeds directly to block 560, where the packet is forwarded. Further, in some embodiments, only certain packets or flows are designated for telemetry collection. For example, in an embodiment, a user or administrator may configure one or more filters or policies to enable telemetry collection for some flows, but not for others. In such an embodiment, prior to adding the INT Header 130, the Leaf 405 determines whether telemetry data is to be collected for the packet. Thus, as illustrated, the Leaf 405 can receive new packets from Workloads 420 and encapsulate them appropriately, before routing them to the next node (e.g., a Spine 410).

Returning to block 510, if the Leaf 405 determines that it is not acting as the ingress node, the method 500 proceeds to block 530. In embodiments, this determination may be based on determining that the packet is already encapsulated, that the packet was received from a Spine 410, and the like. At block 530, the Leaf 405 determines whether the next node (e.g., the node to which the Leaf 405 will send the packet) is outside of the multi-domain deployment. That is, in one embodiment, the Leaf 405 determines whether the next node is the destination Workload 420. If not, the Leaf 405 is acting as an intermediate node in the path of the packet. That is, because the packet was received from the Spine 410, the Leaf 405 is not the ingress node, and because the next node is not the destination, the Leaf 405 is not an egress node. Thus, the method 500 proceeds to block 560, where the Leaf 405 forwards the packet to the next node (e.g., another Spine 410).

If, at block 530, the Leaf 405 determines that the next node is outside of the deployment (e.g., the next node is the destination Workload 420), the method 500 proceeds to block 535, where the Leaf 405 de-encapsulates (or decapsulates) the packet. At block 540, the Leaf 405 determines whether there is an INT Header 130 associated with the packet. If so, this indicates that the packet is an INT packet and was received from a remote domain or logical group (e.g., a different pod, site, or fabric from the one the Leaf 405 belongs to). If no INT Header 130 is present, the method 500 continues to block 560, where the Leaf 405 forwards the de-encapsulated packet to the next node (e.g., to the destination).

Note that in some embodiments, the INT Header 130 is removed by the egress Leaf 405 during the de-encapsulation process. In some embodiments, however, the INT Header 130 may have already been removed. For example, in one embodiment, if the immediately prior node (e.g., a Spine 410) determines that the destination is attached to or associated with the current logical domain, the Spine 410 removes the INT Header 130 prior to transmitting the packet to the Leaf 405, as discussed in more detail below.

Returning to block 540, if the Leaf 405 determines that an INT Header 130 is present, the method 500 proceeds to block 545, where the Leaf 405 extracts telemetry data contained in the INT Header 130 (e.g., added by one or more prior nodes in the multi-domain deployment). Further, the Leaf 405 collects telemetry data regarding its own operations, and aggregates it with the extracted telemetry data. The method 500 then proceeds to block 550, where the Leaf 405 transmits the aggregated telemetry data to the identified collector(s), as discussed above. The packet is then forwarded to the destination Workload 420. In this way, leaf nodes in the multi-domain deployment can encapsulate, de-encapsulate, and route packets, and can add or remove telemetry, as needed.

Although not included in the illustrated embodiment, in embodiments, the Leaf 405 also processes the packet based in part on the source group of the packet. As discussed above, in some embodiments, the first node in the fabric determines the source group (e.g., based on the source node that originally sent the packet), and identifies policies that are defined for this source group. In various embodiments, these policies can include routing or forwarding rules, security policies, and the like.

Figure 6A:
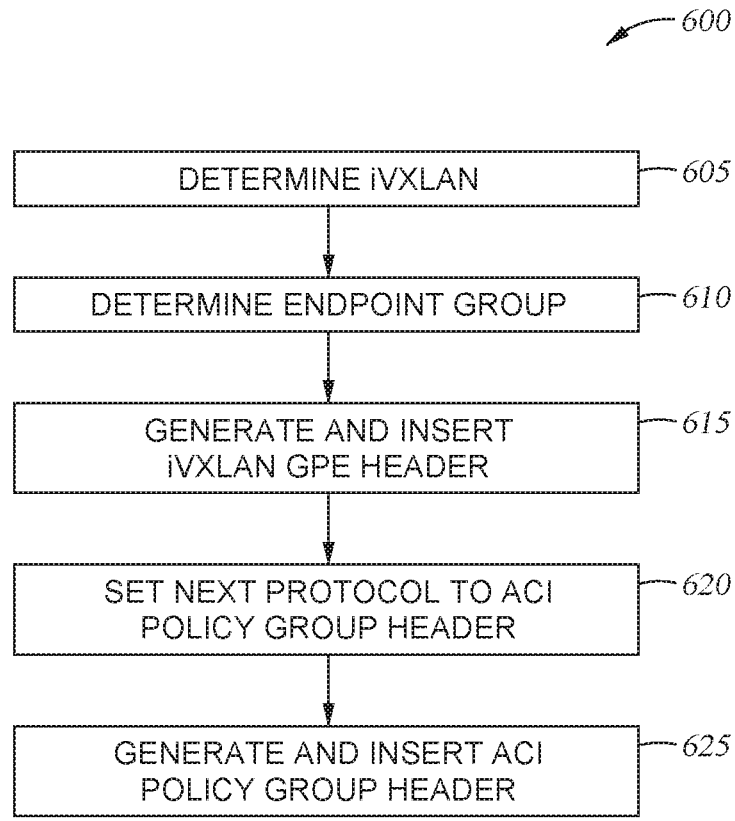
FIG. 6A is a flow diagram illustrating a method of encapsulating packets for transmission in a fabric, according to one embodiment disclosed herein.

FIG. 6A is a flow diagram illustrating a method 600 of encapsulating packets for transmission in a fabric, according to one embodiment disclosed herein. In the illustrated embodiment, the method 600 begins at block 605, where the Leaf 405 determines the iVXLAN for the packet. In one embodiment, the iVXLAN corresponds to the fabric or multi-site deployment itself. The method 600 then continues to block 610, where the Leaf 405 determines the EPG of the packet (e.g., the source group). For example, in one embodiment, the Leaf 405 identifies the source node that originally generated and sent the packet, and determines which EPG the source node is associated with. In one embodiment, each source node is assigned to an EPG based on a configuration of the fabric or deployment, as defined by an administrator. As discussed above, in some embodiments, the packet is processed based on various policies that are identified based on the EPG of the packet.

At block 615, the Leaf 405 generates an iVXLAN GPE header, and encapsulates the packet. In an embodiment, the iVXLAN GPE header includes the Next Protocol field as discussed above, but does not include the source group of the packet. At block 620, the Leaf 405 sets the "next protocol" field of the iVXLAN GPE header to a predefined value associated with an ACI Policy Group header. The method 600 then continues to block 625. At block 625, the Leaf 405 generates an ACI Policy Group header, and inserts it into the packet headers, after the iVXLAN GPE header. In an embodiment, the ACI Policy Group header includes an indication as to the source group or EPG of the packet. In one embodiment, the Leaf 405 sets the "next protocol" field of the ACI Policy Group header to a predefined value which indicates that an Ethernet header follows (e.g., the inner Ethernet header) because the packet does not yet have an INT Header.

Figure 6B:
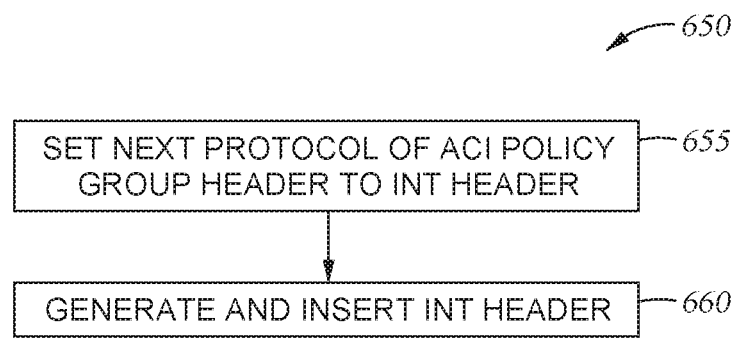
FIG. 6B is a flow diagram illustrating a method of encapsulating packets for transmission in a fabric, according to one embodiment disclosed herein.

FIG. 6B is a flow diagram illustrating a method 650 of encapsulating packets for transmission in a fabric, according to one embodiment disclosed herein. In the illustrated embodiment, the method 650 is used to insert an INT header to a packet. In some embodiments, the method 650 is performed in conjunction with the method 500 (e.g., at the same time the packet is encapsulated, the INT header is added). In some embodiments, however, the packet is encapsulated, and the INT header is added later (e.g., by a Spine 410). The method 650 begins at block 655, where a network node (e.g., a leaf or a spine) sets the "next protocol" of the ACI Policy Group Header associated with the packet to a predefined value that indicates that an INT header follows. The method 650 then proceeds to block 660, where the node generates and adds the INT header to the packet. In this way, the packet can carry s-class information, as well as INT data, through an ACI fabric.

Figure 7:
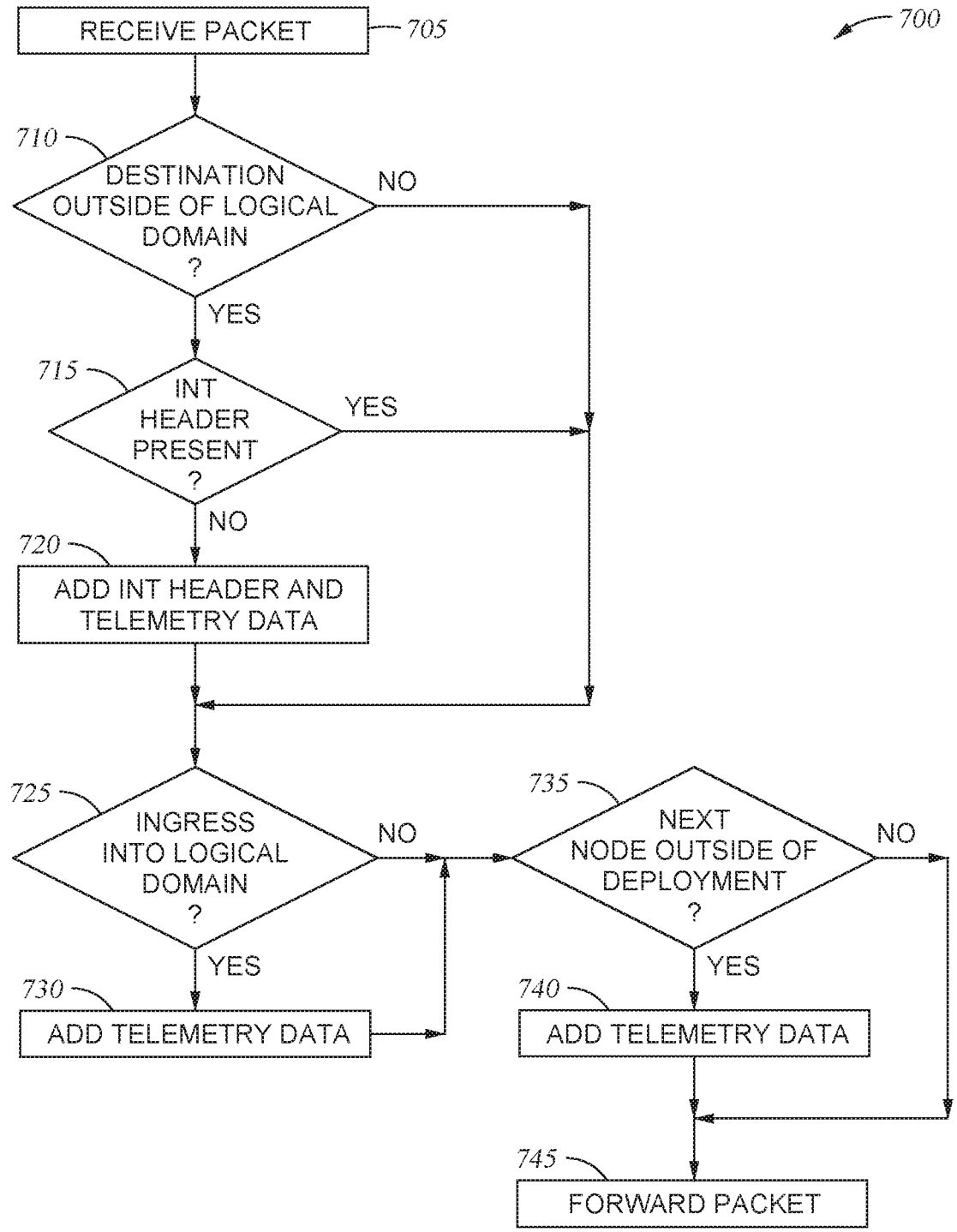
FIG. 7 is a flow diagram illustrating a method of routing packets in a multi-site fabric deployment, according to one embodiment disclosed herein.

FIG. 7 is a flow diagram illustrating a method 700 of routing packets in a multi-site fabric deployment, according to one embodiment disclosed herein. In the illustrated embodiment, the method 700 is performed by Spines 410 in the multi-domain deployment. The method 700 begins at block 705, where the Spine 410 receives a packet. In embodiments, this packet may be received from a Leaf 405 in the same logical domain (e.g., the same pod or site) as the Spine 410, or from a node in a different logical domain or group (e.g., from a spine or remote leaf associated with a different pod or site). The method 700 continues to block 710, where the Spine 410 determines whether the destination of the packet is associated with a different logical domain (as compared to the logical group that the Spine 410 belongs to). For example, in an embodiment, the Spine 410 can determine whether the destination Workload 420 is associated with or attached to the logical group that the Spine 410 belongs to, or with a different group in the multi-group deployment.

If, at block 710, the Spine 410 determines that the packet is destined for a local Workload 420, the method 700 proceeds to block 725, discussed in more detail below. If the packet is destined for a remote Workload 420, the method 700 continues to block 715, where the Spine 410 determines whether the packet is associated with an INT header. That is, as illustrated, based on determining that the packet will traverse at least one border between logical groups, the Spine 410 determines that the packet should carry an INT header. As discussed above, in some embodiments, leaf nodes can add such headers to some or all of the packets. However, in some embodiments, the Spine 410 is responsible for adding the INT Header to some or all of the packets. If an INT header is already present, the method 700 continues to block 725.

If the packet does not yet have an INT header, however, the method 700 continues to block 720, where the Spine 410 adds an INT header. Further, in an embodiment, the Spine 410 collects telemetry data about its own operations, and adds it to the INT header. That is, in an embodiment, because the packet is destined for a remote Workload 420 but does not yet have an INT header, the packet must have been received by a Leaf 405 within the same logical group as the Spine 410, but the Leaf 405 could not (or did not) add the telemetry header (e.g., because it could not or did not determine whether the packet was destined to cross at least one boundary). Thus, the Spine 410 determines that it is the first node in the logical group that can add telemetry data, and does so.

At block 725, the Spine 410 determines whether it is acting as the ingress node into its local logical group. For example, in an embodiment, the Spine 410 determines whether the packet was received from a local Leaf 405, or from a node belonging to a different group or domain (e.g., across an inter-site or inter-pod communications link). If the packet was received from within the local group, the method 700 proceeds to block 735. If, however, the packet was received from a remote logical group, the method 700 continues to block 730, where the Spine 410 adds collects and adds telemetry data about its own operations to the INT header. In this way, the packet header includes information about the border between the logical groups (e.g., about ingress into the particular logical domain to which the Spine 410 belongs). The method 700 then continues to block 735

At block 735, the Spine 410 determines whether the next node to which the packet should be forwarded is outside of the local domain. That is, the Spine 410 determines whether the next node is a local Leaf 405, or if it lies across an inter-site or inter-pod connection. If the next node is local, the method 700 proceeds to block 745, where the Spine 410 forwards the packet to the next node. Otherwise, the method 700 continues to block 740, where the Spine 410 collects and adds telemetry data to the packet. That is, because the Spine 410 is acting as a boundary node (e.g., the packet is crossing a boundary into a different logical domain), the Spine 410 adds egress telemetry. The Spine 410 then forwards the packet accordingly.

In an embodiment, a centralized controller or collector receives network telemetry associated with packets, from one or more nodes in one or more fabrics or logical groups. For example, in embodiments, the final Leaf 405 or Spine 410 may act as a telemetry sink and remove all telemetry data from the packet, prior to forwarding it out of the multi-domain (e.g., multi-site or multi-domain) deployment. In an embodiment, the controller or collector can generate the full network path of the packet, including an indication as to which logical domains or groupings (e.g., which sites, pods, or fabrics) the packet traversed. In some embodiments, the path also includes an indication as to the ingress/egress nodes of each group. Further, in some embodiments, the path includes an indication as to computing resources at each such boundary node (e.g., queue occupancy).

In some embodiments, the controller provides the determined network path to another entity. In embodiments, the path may be provided to an administrator, to another computing device tasked with optimizing the network topology, or to both. In some embodiments, the controller aggregates paths from other packets in the same flow before providing an aggregate flow path for the packets. As discussed above, in some embodiments, a management device can analyze the telemetry data to identify flows that traverse logical boundaries. In some embodiments, if predefined criteria are satisfied (e.g., a threshold number of packets or flows, or a threshold size of the flow) the management device can automatically relocate one or more Workloads 420 to reduce this inter-domain traffic, or can generate and provide an indication or suggestion that one or more Workloads 420 be moved. That is, in an embodiment, the management device can identify Workloads 420 involved in such inter-domain traffic, and determine what affect moving one or both Workloads 420 would have. In one embodiment, the management device can also consider what the effect would be on other Workloads 420 (for example, would one or more other flows become inter-site or inter-pod traffic). In this way, network utilization can be improved, latency and congestion can be reduced, and the overall functioning of the network and the individual fabrics and workloads can be optimized.

Figure 8:
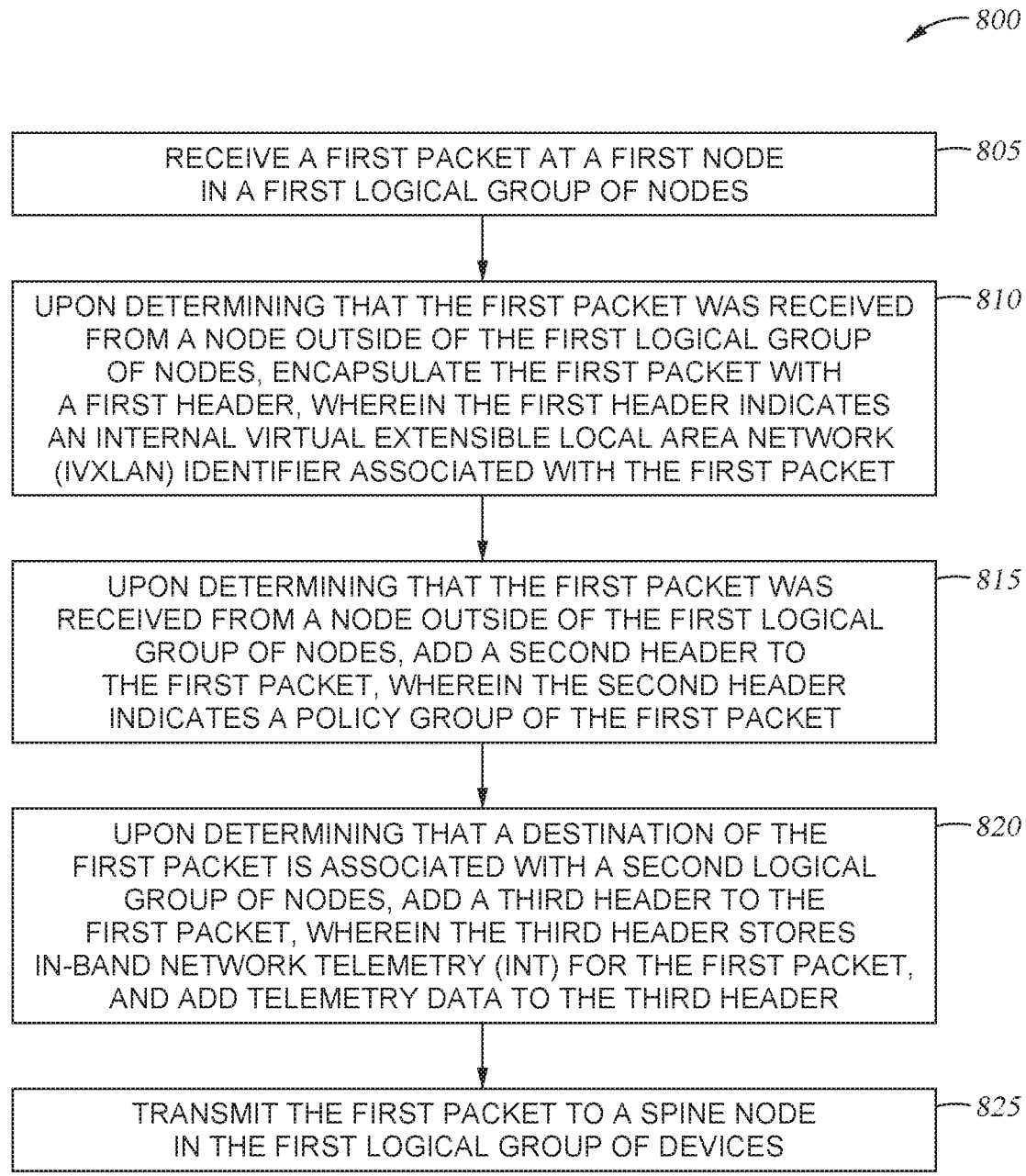
FIG. 8 is a flow diagram illustrating a method of routing packets in a logical group of nodes, according to one embodiment disclosed herein.

FIG. 8 is a flow diagram illustrating a method 800 of routing packets in a logical group of nodes, according to one embodiment disclosed herein. The method 800 begins at block 805, where a Leaf 405 receives a first packet at a leaf node in a first logical group of nodes. At block 810, upon determining that the first packet was received from a node outside of the first logical group of nodes, the Leaf 405 encapsulates the first packet with a first header, wherein the first header indicates an internal virtual extensible local area network (iVXLAN) identifier associated with the first packet. Further, at block 815, upon determining that the first packet was received from a node outside of the first logical group of nodes, the Leaf 405 adds a second header to the first packet, wherein the second header indicates a policy group of the first packet. The method 800 then continues to block 820, where, upon determining that a destination of the first packet is associated with a second logical group of nodes, the Leaf 405 adds a third header to the first packet, wherein the third header stores in-band network telemetry (INT) for the first packet, and adds telemetry data to the third header. Finally, the method 800 proceeds to block 825, where the Leaf 405 transmits the first packet to a spine node in the first logical group of devices.

Figure 9:
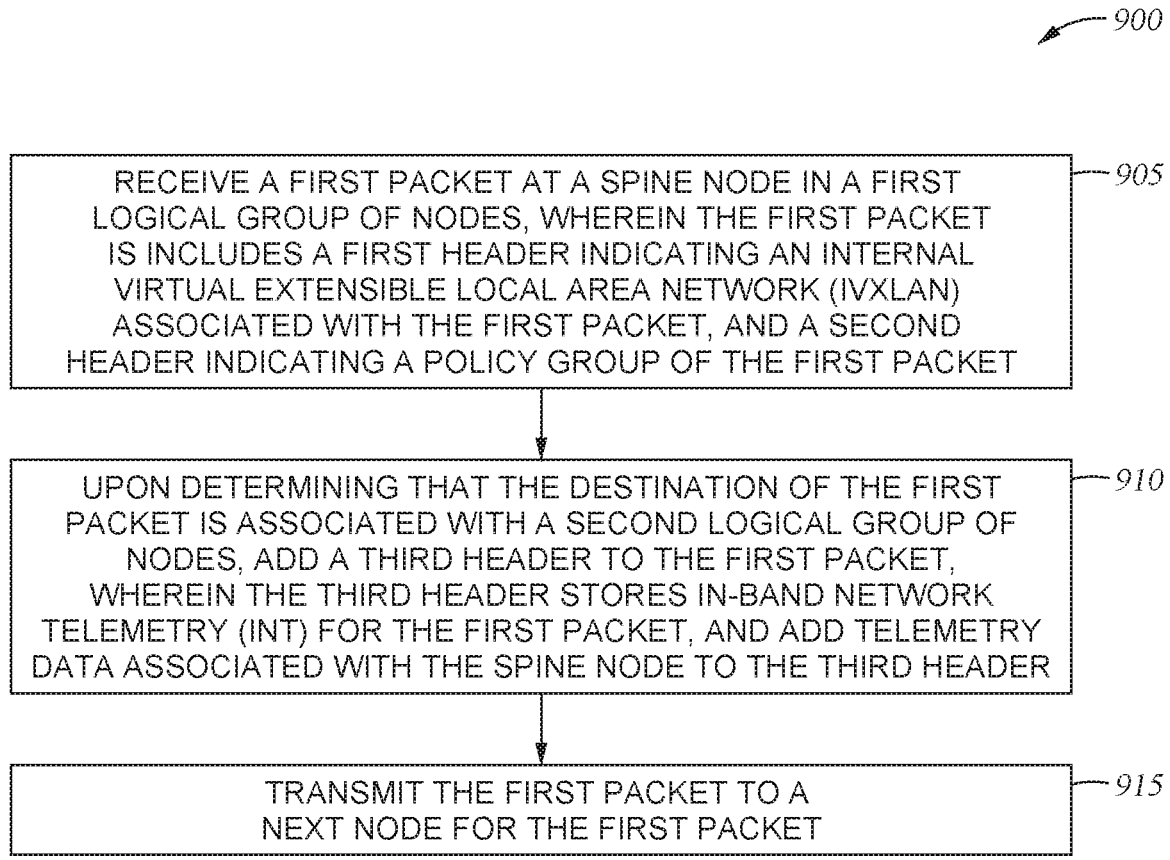
FIG. 9 is a flow diagram illustrating a method of routing packets in a logical group of nodes, according to one embodiment disclosed herein.

FIG. 9 is a flow diagram illustrating a method 900 of routing packets in a logical group of nodes, according to one embodiment disclosed herein. The method 900 begins at block 905, where a Spine 410 receives a first packet at a spine node in a first logical group of nodes, wherein the first packet is includes a first header indicating an internal virtual extensible local area network (iVXLAN) associated with the first packet, and a second header indicating a policy group of the first packet. At block 910, upon determining that the destination of the first packet is associated with a second logical group of nodes, the Spine 410 adds a third header to the first packet, wherein the third header stores in-band network telemetry (INT) for the first packet, and adds telemetry data associated with the spine node to the third header. Finally, the method 900 continues to block 915, where the Spine 410 transmits the first packet to a next node for the first packet.

Figure 10:
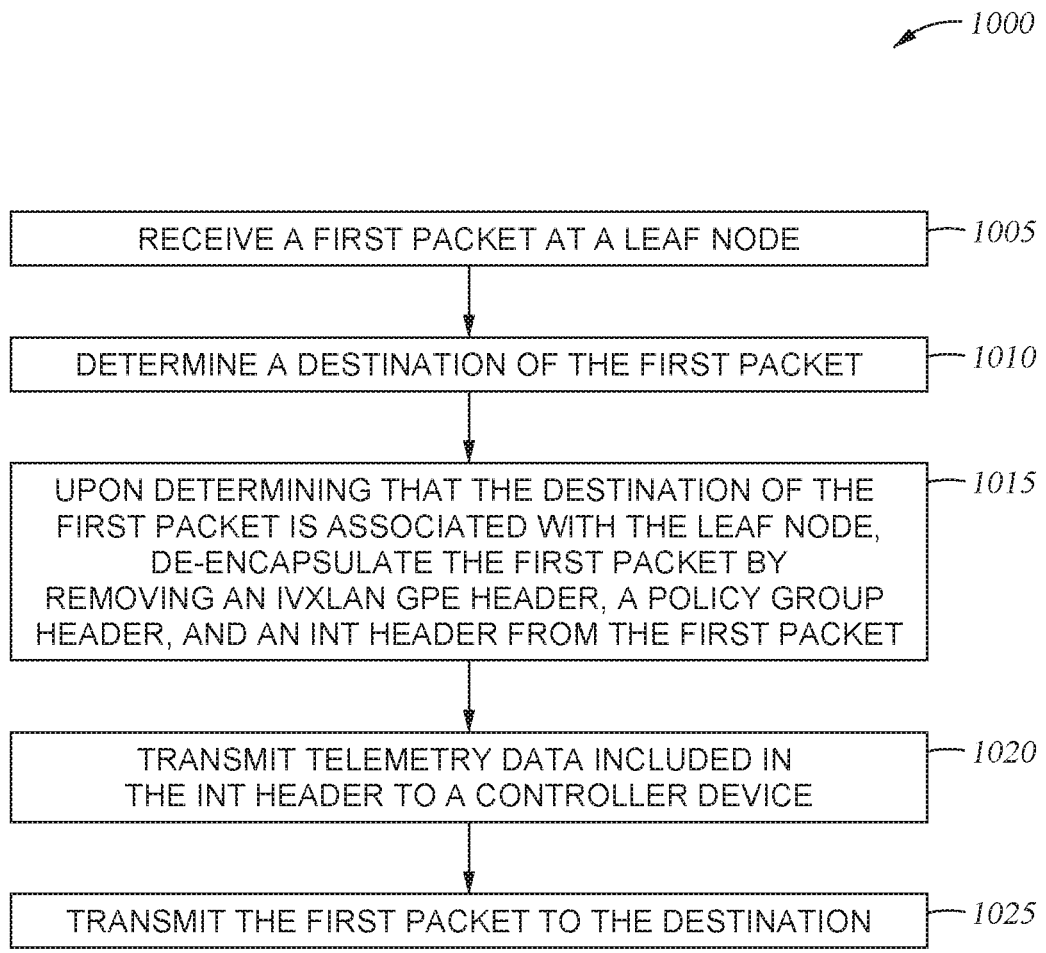
FIG. 10 is a flow diagram illustrating a method of routing packets in a logical group of nodes, according to one embodiment disclosed herein.

FIG. 10 is a flow diagram illustrating a method 1000 of routing packets in a logical group of nodes, according to one embodiment disclosed herein. The method 1000 begins at block 1005, where a Leaf 405 receives a first packet at a leaf node. The method 1000 then continues to block 1010, where the Leaf 405 determines a destination of the first packet. Further, at block 1015, upon determining that the destination of the first packet is associated with the leaf node, the Leaf 405 de-encapsulates the first packet by removing an iVXLAN GPE header, a policy group header, and an INT header from the first packet. Additionally, at block 1020, the Leaf 405 transmits telemetry data included in the INT header to a controller device. Finally, the method 1000 proceeds to block 1025, where the Leaf 405 transmits the first packet to the destination.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving a first packet at a leaf node in a first logical group of nodes;
upon determining that the first packet was received from a node outside of the first logical group of nodes:
encapsulating the first packet with a first header, wherein the first header indicates an internal virtual extensible local area network (iVXLAN) identifier associated with the first packet; and
adding a second header to the first packet, wherein the second header indicates a policy group of the first packet;
upon determining that a destination of the first packet is associated with a second logical group of nodes:
adding a third header to the first packet, wherein the third header stores in-band network telemetry (INT) for the first packet; and
adding telemetry data to the third header;
transmitting the first packet to a spine node in the first logical group of nodes;
receiving a second packet at the leaf node; and
upon determining that both a source of the second packet and a destination of the second packet are associated with the first logical group of nodes, refraining from adding a telemetry header to the second packet.

2. The method of claim 1, wherein the first header further includes an indication that the second header follows the first header, and wherein the second header further includes an indication that the third header follows the second header.

3. The method of claim 1, the method further comprising:
upon determining that the second packet was received from a node outside of the first logical group of nodes:
encapsulating the first packet with a first header, wherein the first header indicates an internal virtual extensible local area network (iVXLAN) identifier associated with the first packet; and adding a second header to the first packet, wherein the second header indicates a policy group of the first packet; and transmitting the first packet to a spine node in the first logical group of nodes.

4. The method of claim 1, the method further comprising:
receiving a third packet at the leaf node;
determining a destination of the third packet; and
upon determining that the destination of the third packet is associated with the leaf node:
  de-encapsulating the third packet by removing an iVXLAN GPE header, a policy group header, and an INT header from the third packet; and
  transmitting telemetry data included in the INT header to a controller device; and
transmitting the third packet to the destination.

5. The method of claim 4, wherein the controller device determines a list of physical sites that the third packet was transmitted through, based on the telemetry data.

6. The method of claim 1, wherein the first logical group of nodes is defined by a common control plane.

7. The method of claim 1, wherein the telemetry data comprises: (i) an identifier of the first logical group of nodes, (ii) a type of the first logical group of nodes, and (iii) an identifier of the leaf node.

8. A computer product comprising logic encoded in a non-transitory medium, the logic executable by one or more processors to perform an operation comprising:
receiving a first packet at a spine node in a first logical group of nodes, wherein the first packet includes a first header indicating an internal virtual extensible local area network (iVXLAN) associated with the first packet, and a second header indicating a policy group of the first packet;
determining, by the spine node, a destination of the first packet;
upon determining that the destination of the first packet is associated with a second logical group of nodes:
  adding, by the spine node, a third header to the first packet, wherein the third header stores in-band network telemetry (INT) for the first packet; and
  adding, by the spine node, telemetry data associated with the spine node to the third header;
transmitting, by the spine node, the first packet to a next node for the first packet;
receiving a second packet; and
upon determining that both a source of the second packet and a destination of the second packet are associated with the first logical group of nodes, refraining from adding a telemetry header to the second packet.

9. The computer product of claim 8, the operation further comprising:
receiving a third packet at the spine node;
upon determining that the third packet was received from a node outside of the first logical group of nodes, adding telemetry data associated with the spine node to a telemetry header associated with the third packet; and
transmitting the third packet to a next node for the third packet.

10. The computer product of claim 8, the operation further comprising:
receiving a third packet at the spine node;
upon determining that the third packet was received from a first leaf node included in the first logical group of nodes, and further determining that a next node for the second packet is a second leaf node included in the first logical group of nodes:
  refraining from adding telemetry data to a telemetry header associated with the third packet; and
  transmitting the third packet to the next node for the third packet.

11. The computer product of claim 8, the operation further comprising:
receiving a third packet at the spine node;
determining a destination of the third packet; and
upon determining that the destination of the third packet is associated with the first logical group of nodes, refraining from adding telemetry data to a telemetry header associated with the third packet; and
transmitting the third packet to a next node for the third packet.

12. The computer product of claim 11, wherein refraining from adding telemetry data to a telemetry header associated with the third packet is performed upon further determining that the third packet was received from a node included in the first logical group of nodes.

13. The computer product of claim 11, the operation further comprising:
removing an INT header from the third packet; and
transmitting telemetry data included in the INT header to a controller device.

14. The computer product of claim 13, wherein the controller device determines a list of physical sites that the third packet was transmitted through, based on the telemetry data.

15. A system comprising:
a leaf node belonging to a first logical group of nodes, the leaf node comprising logic encoded in a non-transitory medium, the logic executable to perform a first operation comprising:
  receiving a first packet;
  determining a destination of the first packet; and
  upon determining that the destination of the first packet is associated with the leaf node:
    de-encapsulating the first packet by removing an iVXLAN GPE header, a policy group header, and an INT header from the first packet; and
    transmitting telemetry data included in the INT header to a controller device;
  transmitting the first packet to the destination;
  receiving a second packet; and
  upon determining that both a source of the second packet and a destination of the second packet are associated with the first logical group of nodes, refraining from adding a telemetry header to the second packet.

16. The system of claim 15, the first operation performed by the leaf node further comprising transmitting telemetry data related to the first packet and associated with the leaf node to the controller device.

17. The system of claim 15, further comprising:
a spine node belonging to the first logical group of nodes, the spine node comprising logic encoded in a non-transitory medium, the logic executable to perform a second operation comprising:
  receiving the first packet;
  upon determining that the first packet was received from a node outside of the first logical group of nodes, adding telemetry data associated with the spine node to the INT header associated with the first packet; and
  transmitting the first packet to the leaf node.

18. The system of claim 17, the first operation performed by the leaf node further comprising:

receiving a third packet;
upon determining that the third packet was received from a node outside of the first logical group of nodes:
encapsulating the third packet with a first header, wherein the first header indicates an internal virtual extensible local area network (iVXLAN) identifier associated with the third packet; and
adding a second header to the third packet, wherein the second header indicates a policy group of the third packet; and
transmitting the third packet to the spine node.

19. The system of claim 18, the second operation performed by the spine node further comprising:
receiving the third packet from the leaf node;
upon determining that a destination of the third packet is associated with a second logical group of nodes:
adding a third header to the third packet, wherein the third header stores in-band network telemetry (INT) for the third packet; and
adding telemetry data associated with the spine node to the third header; and
transmitting the third packet to a next node for the third packet.

20. The system of claim 15, wherein the controller device determines a list of physical sites that the first packet was transmitted through, based on the telemetry data.

* * * * *